Dec. 6, 1960 H. J. HERSHEY 2,963,554
CALL TRANSMITTER
Filed Aug. 6, 1959 2 Sheets-Sheet 1

INVENTOR
H. J. HERSHEY
BY John E. Wagner
ATTORNEY

Dec. 6, 1960 H. J. HERSHEY 2,963,554

CALL TRANSMITTER

Filed Aug. 6, 1959 2 Sheets-Sheet 2

INVENTOR
H. J. HERSHEY
BY John E. Wagner
ATTORNEY

United States Patent Office 2,963,554

Patented Dec. 6, 1960

2,963,554

CALL TRANSMITTER

Harold J. Hershey, Indianapolis, Ind., assignor to Bell Telephone Laboratories, Incorporated, New York, N.Y., a corporation of New York Filed Aug. 6, 1959, Ser. No. 832,072

10 Claims. (Cl. 179—90)

This invention relates to telephone call transmitters, and more particularly to pulsing mechanisms therefor.

Telephone call transmitters of the dial type have long been used in interrupting the direct current path from the telephone central office to the subscriber in order to establish connections for a telephone call. The interruptions, as well known, are termed dial pulses which are produced by opening of a pair of contacts in the direct current loop a number of times indicative of each digit of the dialed number.

Characteristically, in call transmitters energy is stored in a motor spring as the dial finger wheel is moved from a rest position during the wind-up cycle and, upon release and return of the finger wheel by the motor spring, the pulsing contacts are periodically opened and closed a number of times which depends upon the angular displacement of the finger wheel. In the mechanical system of the dial, the torque introduced by the user in winding up the finger wheel is a function of the maximum torque required to separate the contacts as many as ten times during rundown, the energy which is dissipated in a governor for maintaining a constant speed of rundown, the losses in the system and the residual energy stored within the spring while the finger wheel is at rest. It is essential that the finger wheel torque requirement be above a predetermined minimum value, such as 75 gram-centimeters, so that inadvertent movement of the finger wheel by moving or jarring of the telephone set is avoided. At the other extreme, with the current trend towards light-weight telephone sets, those of small size, there is the ever-present danger that the torque required by the dial for error-free pulsing can be furnished only by force on the finger wheel which is sufficient on occasion to move the telephone set. Movement of the telephone set during dialing, as is well known to almost any telephone user, invariably results in a dialing error. Improved waffle-design rubber pads on the bottom of telephone sets have been found to be helpful in reducing the likelihood of movement by increasing the frictional force between the set and the surface upon which it is resting, but the minimization of the likelihood of movement of the set upon wind-up of the dial is still a major consideration in the dial design.

One component of the torque requirement which has been heretofore considered to be inviolate is that required for contact separation. In prior art dials, contact separation has been accomplished by means of a pair of contact arms simultaneously displaced to one side during the wind-up cycle and during the rundown, one of the arms being restrained from movement while the second arm moves rapidly away from the first, thereby opening the contacts. Such mechanical movement offers the advantage of rapid, definite contact opening with a minimum of chatter and in general satisfactory contact operation. A typical disclosure of such a dial-pulsing arrangement may be seen in the patent to Goff et al. No. 2,359,841, issued October 10, 1944.

It has been found that, by the variation in the configuration of the pulsing cam of the type shown in the Goff patent and by changing the mode of the mounting of the cam, all of the advantageous characteristics of the Goff device are retained and in addition the torque requirements for contact separation are greatly reduced. The reduction in torque requirement eliminates the problem of telephone set movement during dial operation.

An understanding of this invention may be had from the following detailed description and by reference to the drawing wherein.

Figures 1, 2, 2A:
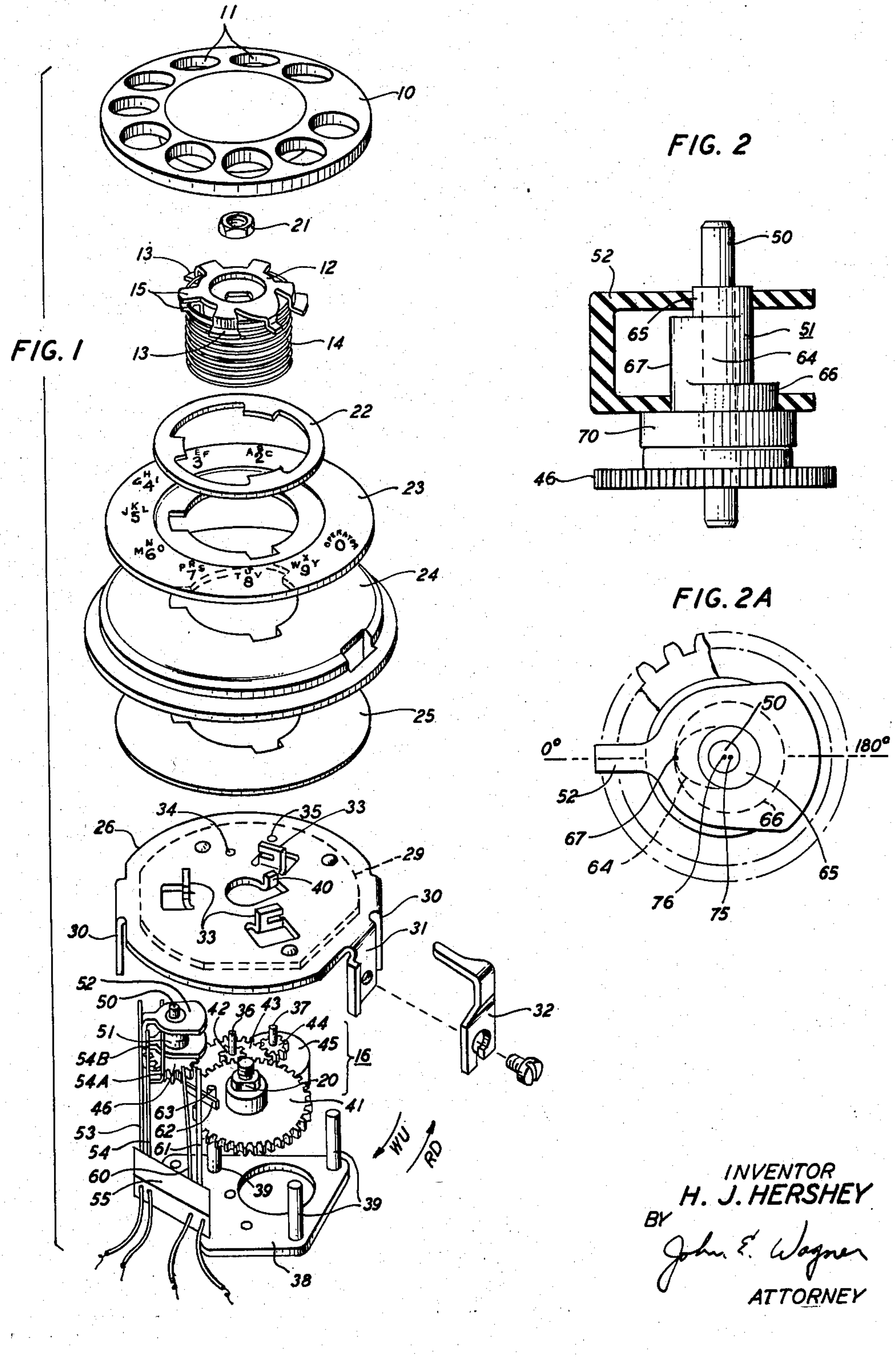
Fig. 1 is an exploded view of a telephone dial incorporating this invention.
Fig. 2 is a greatly enlarged elevational view of the pulsating cam and cam follower assembly.

Fig. 2*a* is a greatly enlarged plan view of the pulsing cam and cam follower assembly; and Figs. 3–7 are fragmentary views of the pulsing cam and contact arrangement during various stages of wind-up and run-down of the dial.

Referring now to Fig. 1, the entire dial assembly may be seen as including a finger wheel 10 which includes the normal finger openings 11 and includes in the underside a plurality of channels, unshown in the drawing, which afford connection to a spider 12 in the manner shown in the Patent 2,666,097 to W. G. Breivogel, issued January 12, 1954. Step-shaped arms 13 of the spider enclose a portion of a motor spring 14, one end of which is rigidly secured between two arms 15 of the spider 12. A central opening in the spider 12 of non-circular configuration allows the mechanical coupling of the spider and consequently the finger wheel to a gear train 16 shown at the bottom of Fig. 1 by a similarly shaped shaft 20. The spider 12 is maintained in position on the shaft 20 by a nut 21.

Underlying the motor spring in the exploded view of Fig. 1 is a retainer ring 22 designed to hold in place a number plate 23, a light conductor 24 for a dial light and a planar plastic disk 25 employed for reflection of light through the light conductor 24. Greater information about the dial light may be obtained by referring to my copending patent application Serial No. 819,678, filed June 11, 1959. Underlying the disk 25 is the frame of the dial 26 of stamped sheet metal including a pair of depending mounting lugs 30, a depending tab 31 for mounting a finger stop 32 and three upstanding notched tabs 33 which are designed to secure retainer ring 22 in place. The frame 26 additionally includes a central opening which allows passage of the shaft 20 of the gear train 16 therethrough and clearance openings 34 and 35 for shafts 36 and 37, respectively, of the gear train. The central opening of frame 26 is bounded in part by an integral stop 40 which limits the wind-up of the dial. Secured beneath the frame 26 is a bearing plate 29 shown by dotted lines in which the shafts of the pulsing mechanism are journaled. A second bearing plate 38 spaced from the frame 26 and first bearing plate 29 by stubs 39 provides the bearing openings for the opposite ends of the shafts of the pulsing mechanism.

The gear train assembly 16 includes a major gear 41 secured to shaft 20 which meshes with gear 42 on shaft 36. An additional gear 43, also mounted on shaft 36, mates with a gear 44 which drives the weights of a governor, the drum 45 of which may be seen in the drawing. The gear 43 additionally meshes with a gear 46 on a shaft 50 which mounts a pulsing cam 51. Journaled about a pair of circular surfaces on the cam 51 is a yoke 52. A pair of contact-carrying arms 53 and 54 are secured to an insulating molded plastic mounting block 55 and extend into contact with the yoke 52 and the pulsing cam 51, respectively. The contact-carrying arm 54 is bifurcated including one arm 54A riding as a cam follower on the cam 51 and the other arm 54B constituting the contact-carrying arm. These contacts are the dial-pulsing contacts of the dial which are periodically opened and closed by the operation of the pulsing cam and the yoke, as will hereinafter be described.

Another set of contact-carrying arms 60 and 61 are secured in mounting block 55. The contact-carrying arm 60 includes a tab 62 which rides against a stud 63 on the gear 41. The gear 41 is shown in the normal rest position of the finger wheel wherein the stud 63 presses against the tab 62 and the contacts carried by arms 60 and 61 are opened. Upon wind-up of the dial the gear 41 is arranged to be driven in a clockwise manner, as indicated by the arrow marked WU in the drawing so that stud 63 moves away from tab 62 and the contacts of arms 60 and 61 are closed. These are the off-normal contacts which are used in the telephone set to disable the telephone receiver circuit whenever the dial is away clockwise direction, as indicated by the arrow marked RD, from its rest position. After rundown in a counterclockwise direction, as indicated by the arrow marked RD, the stud again bears against the tab 62 while contacts 61 and 62 are reopened.

The details of this invention revolve about the contour of the pulsing cam assembly which may be seen more clearly in Fig. 2. The pulsing cam 51 is advantageously a unitary molded piece, preferably of a material having good wear and self-lubrication characteristics such as the moldable polyamide resins commonly known as nylon. The cam 51 includes molded therethrough the shaft 50 which advantageously may be of steel, on which the cam 51 rotates during dial operation. The cam 51 includes a central cam surface 64 having a single lobe 67 for producing one lateral displacement of the cam follower per revolution. Each end of the cam 51 includes circular cylindrical bearing surfaces 65 and 66 which have a common central axis. The common central axis of the bearing surfaces 65 and 66 is eccentric or displaced from the central axis of the shaft 50. The displacement of the axis of the bearing surfaces 65 and 66 is 180 degrees opposite to the position of the single lobe 67 of the central cam surface 64. Journaled about the bearing surfaces 65 and 66 is the yoke 52 of slightly flexible molded dielectric material such as the polyoxymethylene resin known by the trademark "Delrin" of the E. I. du Pont Company. Underlying the cam member 51 and the yoke 52 is a retaining member 70 which may be of spring material such as Phosphor bronze and is frictionally secured to the shaft 50. Beneath the member 70 is the gear 46 force fit on the shaft 50. The arms of yoke 52 are flexed slightly inward in their assembled position to provide frictional engagement with member 70.

The relative positioning of the axes of the shaft 50 with respect to the cam surface may be seen in Fig. 2A. The central axis of the surfaces 65 and 66 as shown in Fig. 2A is a point 75 displaced to the right in the drawing from the axis of the shaft 50 identified as point 76, while the single lobe 67 of the cam surface 64, the apex of which is identified by the point 67, is displaced to the left. Consequently, with the arrangement shown, the cam surface 64 and the bearing surfaces 65 and 66 about which the yoke 52 is journaled are eccentric with respect to the shaft 50 and both exhibit eccentricity 180 degrees with respect to each other. The eccentricity of the cam and bearing surfaces which, as will be shown hereinafter, determines the opening of the contacts, is fixed in that it is molded integrally into the single part and is not affected by the position of the shaft molded within the part. The accuracy of the pulsing of this dial therefore is largely a function of the accuracy of the molded dimensions on a single part. The accuracy is not limited by the accuracy of the position of a molded insert such as the shaft 50 with respect to certain surfaces 64, 65 and 66 on the molded part itself. The improved accuracy in this most critical part of the dial results in more accurate dial pulsing with the consequent reduction in dialing errors particularly on long telephone loops.

As may be seen in Fig. 2, the bearing surface 66 has a substantially larger diameter than the bearing surface 65. The need for this arrangement is apparent when one considers the fact that both the cam surface 64 and the bearing surfaces 65 and 66 are part of a unitary molded element. The bearing surface 66 is necessarily of sufficient diameter that in assembly of the member 51 and the yoke 52 one arm of the yoke may be slipped over the cam surface 64 before it can come to rest on its bearing surface 66. The second arm of the yoke has an opening smaller than the cam surface 64 dimensions, and the bearing surface 65 similarly is smaller than the cam 67.

Also, in the form shown, the axis of the bearing surfaces 65 and 66 is displaced 180 degrees with respect to the lobe 67 of the cam surface 64. This is the optimum angle since it affords the greatest lateral displacement of the contact springs 53 and 54 which bear thereagainst. However, the displacement may be at any angle between 90 degrees and 270 degrees in order to achieve some lateral displacement of both contact springs. If the displacement is less than 90 degrees or greater than 270 degrees, the contact spring 53 will actually tend to follow the contact spring 54 during the pulsing cycle and contact opening will be impaired. Consequently, the range of 90 degrees to 270 degrees only is useful and the 180 degree orientation preferred.

Figure 3:
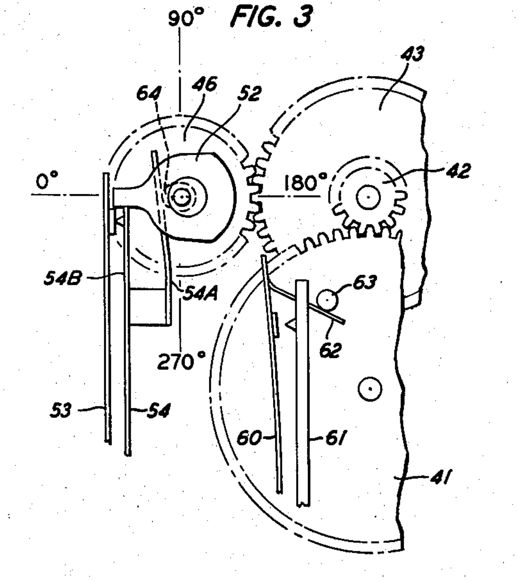

The effect of the assembly of the pulsing cam may be readily seen from Figs. 3–7, showing the operation of the dial in the generation of a single dial pulse. In Fig. 3 the pulsing mechanism is shown in its "at rest" position. The stud 63 of gear 41 bears against the arm 62 of contact-carrying arm 60, thereby separating it from contact-bearing arm 61. The gears 42, 43 and 46 are, of course, immobile and the surface 64 of the cam 51 bears against the contact-bearing arm 54, holding that arm in its position of greatest lateral displacement in the direction indicated as 0 degree. The contact on arm 53 is supported by the contact on arm 54, both arms being slightly flexed in the 0 degree direction. The yoke 52, though extending in the zero direction does not bear against contact arm 53 because of its lateral displacement. With contact arm 53 bearing against the contact of arm 54, the solid circuit connection between the two is assured in this normal rest position.

Figure 4:
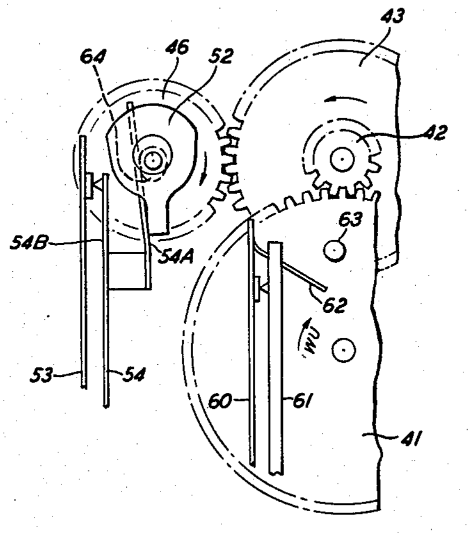
Figure 5:
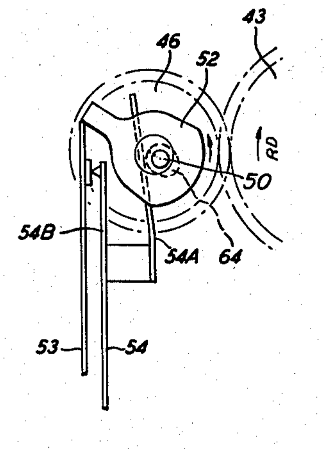

During the wind-up cycle of the dial the relative movement may be seen in Fig. 4 for gear 41 is then moved in a clockwise direction moving stud 63 from the tab 62 of arm 60, closing off normal contacts of arms 60 and 61. The gears 42 and 43 are rotated in a counterclockwise direction while the mating gear 46 is displaced in a clockwise direction. In the absence of any restraining force, the yoke 52 rotates with gear 46 and its cam 51 until the yoke strikes the cam follower 54A of arm 54 where it rests during the remainder of the wind-up cycle. As shown in Fig. 4, the gear 46 has traversed 270 degrees so that the cam surface 64, shown in dashed lines, no longer holds the contact arms 54 and 53 displaced as far to the left. The arms are, however, flexed to the extent that even in this lower position arm 53 bears against 54 and the contacts thereon remain closed. For each revolution of the gear 46 which is equal to the angular displacement of the finger wheel for one digit, the cam surface 64 traverse 360 degrees and the contact arms 53 and 54 while bearing together oscillate laterally while maintaining the contacts closed. The yoke 52, during this period, remains at rest against the cam follower 54A.

At the point of maximum travel and upon release of the finger wheel the motor spring of Fig. 1 begins to drive the gear train back to the rest position. The gear 43 commences to turn in a clockwise direction while gear 46 rotates in a counterclockwise manner. The yoke 52, unrestrained from rotation in a counterclockwise direction, rotates with the cam member 51 until it strikes the upper end of the contact arm 53, as may be seen in Fig. 5. During this period of rotation of the gear 46 the cam surface 64 is similarly moved approximately 230 degrees so that it extends in the same direction as the yoke 52. Upon further rotation in the order of 40 degrees the cam surface 64 reaches its highest point, for example 0 degree, with respect to the cam follower 54A and the arms 53 and 54 are displaced in the 0 degree direction sufficiently that the restraint upon movement of the yoke 52, by contact with the arm 53 is removed and yoke 52 rotates an additional 40 degrees until it extends in the 0 degree direction and in a position to bear directly against the contact arm 54. This point of the cycle is disclosed in Fig. 6.

Figure 6:
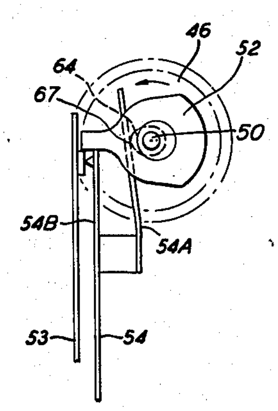

In the position shown in Fig. 6 with both the cam lobe 67 and the yoke 52 extending in the 0 degree direction, the contacts of arms 53 and 54 still remain closed since the difference in level between the yoke and the cam surface 64 is less than the normal unrestrained distance between the cam follower 54A and the contact arm 53. Upon further rotation of the gear 46 with continuing rundown, the cam surface 64 moves in a counterclockwise direction from the zero direction to the 180 degree direction while the yoke is restrained from rotation in the same direction by contact arm 53. While failing to rotate because of the restraint of the contact arm 53, the yoke 52, because of its eccentric mounting on the shaft 50, is actually translated laterally in the 0 degree direction twice the distance of its eccentricity to a position appearing in Fig. 7.

Meanwhile, upon the 180 degree counterclockwise rotation of the cam surface 64, the lobe facing in the 180 degree direction presents the lowest displacing surface to the cam follower 54A. Consequently, during this 180 degrees of rotation, the yoke 52, being displaced in the 0 degree direction actually flexes the contact-bearing arm 53 in that 0 degree direction while the cam 60 allows the contact-bearing arm 54 to move in the 180 degree direction, opening the contacts by moving the arms 53 and 54 away from each other. Further rotation of the shaft 50 and the cam of surface 64 returns the arm 54 into contact with arm 53, whereupon the assembly assumes the same configuration as in Fig. 6.

Figure 7:
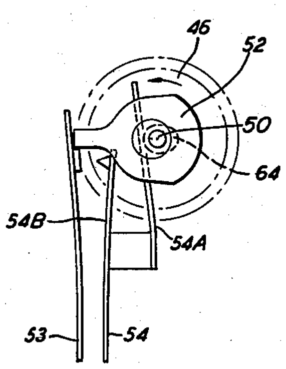

Each complete revolution during the rundown cycle includes the movement from the position of Fig. 6 with contacts closed to that of Fig. 7 with contacts open and returning to the position of Fig. 6. The number of such cycles or, in other words, the number of revolutions of the gear 46 determines the number of contact separations or dial pulses generated by the call transmitter.

As may be seen from Figs. 2–7, the operation of pulsing has at its heart the contour of the pulsing cam 51 and its movement with respect to the yoke 52 and the shaft 50. The yoke 52 is journaled on the bearing surfaces 65 and 66 of the cam member 51, and the bearing surfaces are eccentric with respect to the shaft 51. The cam surface 64 of the cam member 51 is also eccentric with respect to the shaft 50 and exhibits an eccentricity of 180 degrees with respect to the bearing surfaces 65 and 66. These eccentricities produce contact separation by flexing the contact arms 53 and 54 in opposite directions.

It is well known in the art of spring design that the force required to displace a flexing spring is a function of a spring constant and the displacement. The spring constant of the arms 53 and 54 may be advantageously the same as in previous dial assemblies. The displacement of each of the arms, however, is reduced by approximately fifty percent. Consequently the peak torque on the cam shaft 50 required for contact separation is similarly reduced. The force for contact separation is produced from the torque stored in the motor spring. Through this change or reduction in the amount of torque required for contact separation, overall torque requirement for the dial may be reduced. For example, in a pulsing assembly identical in every respect with that shown in Fig. 1, except for the eccentric displacement of the bearing surfaces 65 and 66 of Fig. 2, the difference in the maximum torque is at least twenty percent. This reduction is sufficient to minimize or virtually eliminate the movement of the telephone set.

In all cases it is understood that the above-described arrangements are merely illustrative of the principles of the invention. Numerous and varied other embodiments may be devised in accordance with these principles by those skilled in the art without departing from the spirit and scope of the invention.

What is claimed is:

1. In a telephone call transmitter of the type including a gear train, a finger wheel for introducing angular displacement into the gear train, a return spring coupled to said finger wheel and gear train for returning the finger wheel and gear train to the original position after displacement and release, a pair of normally closed contact springs, and a pulsing mechanism for periodically displacing the contact springs to open the contact therebetween, the improvement wherein said pulsing mechanism comprises a shaft coupled to the gear train, a cam including a single lobe secured to said shaft, a member defining at least one bearing surface of circular cross-section secured to said shaft, the bearing surface of said member having an axis parallel to but displaced from the axis of said shaft, an arm journaled about the bearing surface of said member, said arm and cam being so positioned with respect to respective contact springs that upon rotation of said shaft the contact springs are displaced in opposite directions to open the contact therebetween.

2. In a telephone call transmitter of the type including a gear train, a finger wheel for introducing angular displacement into the gear train, a return spring coupled to said finger wheel and gear train for returning the finger wheel and gear train to the original position after displacement and release, a pair of normally closed contact springs, and a pulsing mechanism for periodically displacing the contact springs to open the contact therebetween, the improvement wherein said pulsing mechanism comprises a shaft coupled to the gear train, a cam including a single lobe secured to said shaft, a member defining at least one bearing surface of circular cross-section secured to said shaft, the bearing surface of said member having an axis parallel to the axis of said shaft but displaced therefrom in a direction between 90 degrees and 270 degrees from the direction of the lobe of said cam, an arm journaled about the bearing surface of said member, said arm and cam being so positioned with respect to respective contact springs that upon rotation of said shaft the contact springs are displaced in opposite directions to open the contact therebetween.

3. In a telephone call transmitter of the type including a gear train, a finger wheel for introducing angular displacement into the gear train, a return spring coupled to said finger wheel and gear train for returning the finger wheel and gear train to the original position after displacement and release, a pair of normally closed contact springs, and a pulsing mechanism for periodically displacing the contact springs to open the contact therebetween, the improvement wherein said pulsing mechanism comprises a shaft coupled to the gear train, a cam including a single lobe secured to said shaft, a member defining at least one bearing surface of circular cross-section secured to said shaft, the bearing surface of said member having an axis parallel to the axis of said shaft but displaced therefrom in a direction substantially 180 degrees from the direction of the lobe of said cam, an arm journaled about the bearing surface of said member, said arm and cam being so positioned with respect to respective contact springs that upon rotation of said shaft the contact springs are displaced in opposite directions to open the contact therebetween.

4. In a telephone call transmitter of the type including a gear train, a finger wheel for introducing angular displacement into the gear train, a return spring coupled to said finger wheel and gear train for returning the finger wheel and gear train to the original position after displacement and release, a pair of normally closed contact springs, and a pulsing mechanism for periodically displacing the contact springs to open the contact therebetween, the improvement wherein the pulsing mechanism comprises a shaft coupled to the gear train, a member secured to said shaft, said member including a first surface defining a cam having a single lobe, said member including a second surface defining a circular bearing surface having an axis parallel to but displaced from the axis of said shaft, an arm journaled about the bearing surface of said member, said arm and cam being so positioned with respect to respective contact springs that upon rotation of said shaft the contact springs are displaced in opposite directions to open the contact therebetween.

5. The combination in accordance with claim 4 wherein said member is a unitary body molded about said shaft.

6. The combination in accordance with claim 5 wherein said body is of a polyamide resin.

7. In a telephone call transmitter of the type including a gear train, a finger wheel for introducing angular displacement into the gear train, a return spring coupled to said finger wheel and gear train for returning the finger wheel and gear train to the original position after displacement and release, a pair of normally closed contact springs, and a pulsing mechanism for periodically displacing the contact springs to open the contact therebetween, the improvement wherein said pulsing mechanism comprises a shaft coupled to the gear train, a member defining a pair of concentric bearing surfaces of circular cross-section secured to said shaft, the bearing surface of said member having an axis parallel to but displaced from the axis of said shaft, a cam including a single lobe secured to said shaft, the lobe of said cam bearing in a direction remote from the direction of displacement of the axis of said bearing surfaces, a yoke including a pair of arms and a central connecting portion, the arms of said yoke journaled about respective bearing surfaces of said member, said cam being positioned with respect to one of said contact springs so that the contact spring bears thereagainst, said yoke being rotatable into contact with the second contact spring, said cam and yoke by eccentric motion upon rotation of the shaft being operative to displace said contact springs in opposite directions to open the contact therebetween.

8. The combination in accordance with claim 7 wherein said cam and bearing surfaces are part of a unitary member.

9. The combination in accordance with claim 8 wherein said unitary member is of polyamide resin.

10. The combination in accordance with claim 7 wherein said bearing surfaces are positioned on opposite sides of said cam surface, and one of said bearing surfaces having a diameter at least as great as the major dimension of said cam.

References Cited in the file of this patent

UNITED STATES PATENTS 2,563,581 Clarke ---------------- Aug. 7, 1951